(12) United States Patent
Xiao et al.

(10) Patent No.: US 11,923,136 B2
(45) Date of Patent: Mar. 5, 2024

(54) MAGNETIC COUPLING AND USE AND ADJUSTMENT METHOD THEREOF

(71) Applicant: Zhuzhou Times New Material Technology Co., Ltd., Hunan (CN)

(72) Inventors: Guanghui Xiao, Hunan (CN); Caichun He, Hunan (CN); Fengchen Tu, Hunan (CN); Hao Li, Hunan (CN)

(73) Assignee: Zhuzhou Times New Material Technology Co., Ltd., Hunan (CN)

( * ) Notice: Subject to any disclaimer, the term of this patent is extended or adjusted under 35 U.S.C. 154(b) by 191 days.

(21) Appl. No.: 17/636,362

(22) PCT Filed: Nov. 10, 2020

(86) PCT No.: PCT/CN2020/127763
§ 371 (c)(1),
(2) Date: Feb. 18, 2022

(87) PCT Pub. No.: WO2021/098548
PCT Pub. Date: May 27, 2021

(65) Prior Publication Data
US 2022/0285063 A1    Sep. 8, 2022

(30) Foreign Application Priority Data

Nov. 22, 2019   (CN) .......................... 201911156080.9

(51) Int. Cl.
*H02K 49/06* (2006.01)
*H01F 7/06* (2006.01)
*H01R 39/64* (2006.01)

(52) U.S. Cl.
CPC ............. *H01F 7/066* (2013.01); *H01R 39/64* (2013.01); *H02K 49/06* (2013.01); *H01F 2007/062* (2013.01)

(58) Field of Classification Search
CPC ...................................................... H02K 49/06
See application file for complete search history.

(56) References Cited

FOREIGN PATENT DOCUMENTS

| CN | 101039008 | 9/2007 |
|----|-----------|--------|
| CN | 101391330 | 3/2009 |

(Continued)

OTHER PUBLICATIONS

"International Search Report (Form PCT/ISA/210) of PCT/CN2020/127763," dated Feb. 18, 2021, with English translation thereof, pp. 1-6.

*Primary Examiner* — Ramon M Barrera
(74) *Attorney, Agent, or Firm* — JCIPRNET

(57) ABSTRACT

A magnetic coupling, includes a driving rotor sleeved on the driving shaft, a driven rotor sleeved on the driven shaft, external magnets mounted on the driving rotor and internal magnets mounted on the driven rotor and located on the inner sides of the external magnets; a plurality of internal magnets are arranged and uniformly distributed along the circumferential direction of the driven rotor; the external magnets and the internal magnets are aligned one by one along a radial direction; the internal magnets and the external magnets are magnetized along the radial direction; adjacent internal magnets have opposite magnetizing directions, and adjacent external magnets have opposite magnetizing directions; magnetic poles of the internal magnets are opposite to magnetic poles of the corresponding external magnets, and the driving rotor and the driven rotor form a working magnetic circuit through a magnetic field generated by the external magnets and a magnetic field generated by the internal magnets, wherein at least the external magnets are magnet exciting coils that generate a working magnetic field through power supply.

10 Claims, 4 Drawing Sheets

(56) References Cited

FOREIGN PATENT DOCUMENTS

| | | |
|---|---|---|
| CN | 201478983 | 5/2010 |
| CN | 101873053 | 10/2010 |
| CN | 101931308 | 12/2010 |
| CN | 102624198 | 8/2012 |
| CN | 202679218 | 1/2013 |
| CN | 203674953 | 6/2014 |
| CN | 104065236 | 9/2014 |
| CN | 104242599 | 12/2014 |
| CN | 204144559 | 2/2015 |
| CN | 105048235 | 11/2015 |
| CN | 205724308 | 11/2016 |
| CN | 206060507 | 3/2017 |
| CN | 208738583 | 4/2019 |
| CN | 209105008 | 7/2019 |
| CN | 110855123 | 2/2020 |
| JP | 2011234535 | 11/2011 |

MAGNETIC COUPLING AND USE AND ADJUSTMENT METHOD THEREOF

CROSS-REFERENCE TO RELATED APPLICATION

This application is a 371 of international application of PCT application serial no. PCT/CN2020/127763, filed on Nov. 10, 2020, which claims the priority benefit of China application no. 201911156080.9, filed on Nov. 22, 2019. The entirety of each of the above mentioned patent applications is hereby incorporated by reference herein and made a part of this specification.

TECHNICAL FIELD

The present invention relates to a magnetic coupling and a use and adjustment method thereof, and belongs to the technical field of magnetic couplings.

BACKGROUND

The coupling is widely used in various general machines, as a machine part used for connecting two shafts (a driving shaft and a driven shaft) in different mechanisms so that they rotate together to transfer torque. The traditional couplings are contact couplings and must transfer the torque through the mutual connection between the driving shaft and the driven shaft, with complex structure, high manufacturing accuracy and easy damage to components when overloading. Especially when the driving shaft and the driven shaft are operated in two different media that need to be isolated from each other, sealing elements must be used for dynamic seal, which may cause the problem of increasing rotating resistance to ensure reliable seal or generating leakage due to untight seal. In addition, as the sealing elements are worn and aged, the leakage will be more serious. Especially in a system with harmful gases (harmful liquid), once the leakage occurs, the environment may be polluted, bringing a threat to life.

To overcome the above defects of the traditional couplings, a magnetic coupling appears in the prior art. The magnetic coupling is a non-contact coupling, and has the biggest characteristic of breaking the structural form of the traditional couplings to adopt a new magnetic coupling principle to realize force and moment transfer between the driving shaft and the driven shaft without direct contact and convert the dynamic seal into static seal so as to realize zero leakage. Therefore, the magnetic coupling is widely used in occasions with specific requirements for the leakage.

The magnetic couplings in the prior art generally have two main structures: the planar magnetic coupling and the coaxial magnetic coupling. The magnetic coupling shown in FIG. 1 is closest to this technical solution. The magnetic coupling is composed of external magnets, internal magnets and a shielding case. The internal magnets and the external magnets are composed of permanent magnets which are magnetized along a radial direction and having opposite magnetization directions. The permanent magnets are alternately arranged in circumferential directions with different polarities, and fixed on low carbon steel rings to form a magnetic circuit breaker continuum. The shielding case is made of non-ferritic (and thus non-magnetic) high resistance material. At a stationary state, the N poles (S poles) of the external magnets and the S poles (N poles) of the internal magnets attract each other and form a straight line; and at this moment, the torque is zero, as shown in FIG. 2. When the external magnets rotate under the drive of a power machine, the internal magnets are still at the stationary state at the beginning due to the action of a frictional force and resistance of a transmitted part; at this moment, the external magnets start to deviate from the internal magnets by a certain angle; due to the existence of the angle, the N pole (S pole) of the external magnets has a pulling effect on the S pole (N pole) of the internal magnets, and the N pole (S pole) of the external magnets has a pushing effect on the previous N pole (S pole) of the internal magnets, so as to drive the internal magnets to rotate, as shown in FIG. 3. In a transmission process, the shielding case separates the external magnets from the internal magnets. The magnetic lines of force pass through shielding case to transfer the power and motion of the external magnets to the internal magnets, thereby realizing non-contact static seal transmission.

In addition, a magnetic coupling disclosed in Chinese patent CN104242599A is also the prior art closest to the technical solution, comprising a driving shaft 1, a driven shaft 2, an outer rotor 3 and an inner rotor 4. The driving shaft 1 is fixedly connected with the outer rotor 3; the driven shaft 2 is fixedly connected with the inner rotor 4; and an isolating sleeve is arranged between the outer rotor 3 and the inner rotor 4. Four driven permanent magnets 6 are fixed on the outer surface of the inner rotor 4, and corresponding permanent magnets 7 are also arranged at the inner side of the outer rotor 3 along the axial direction.

Thus, in the above prior art, the inner rotor and the outer rotor provide magnetic forces through the arrangement of the permanent magnets, and the shielding case is installed between the inner rotor and the outer rotor for sealing.

Problems in the prior art: the inner rotor and the outer rotor adopt the permanent magnets with strong magnetism in the prior art; a little carelessness in the installation process will make the permanent magnets of the inner rotor and the outer rotor attract together and difficult to separate; a large attraction force can even cause damage to the permanent magnets, thereby increasing installation difficulty; Once the permanent magnets are magnetized, the magnetic characteristics are determined and the transfer torque of the coupling cannot be adjusted. Therefore, different couplings need to be customized according to different loads, and the product has poor universality; and moreover, when overloading occurs, sliding failure may appear. In order to maximize the universal range, the maximum magnetic characteristics of the permanent magnets are usually used to increase the maximum transfer torque of the coupling, resulting in waste of resources. When the torque is increased, the electromagnetic stiffness between the inner rotor and the outer rotor may be increased, resulting in poor cushioning and damping effects of the coupling. In addition, due to the existence of the shielding case, a working air gap of a magnetic circuit between the inner rotor and the outer rotor may be increased, thereby affecting the working magnetic field strength so that the magnetic coupling is limited in application because of too small transfer torque.

In conclusion, the prior art has the problems of too small and unadjustable transfer torque, poor universality, difficult installation, easy damage and poor cushioning and damping effects.

In view of the above problems in the prior art, the technical solution of the patent of the present invention is intended to break the structural form of the prior art and design a novel magnetic coupling with large and variable torque, convenient and reliable installation, better cushioning and damping effects, strong universality and wide application range.

SUMMARY

The magnetic coupling and the use and adjustment method thereof provided by the present invention realize variable transfer torque of the magnetic coupling, change the size of the transfer torque so that the coupling is applicable to operating conditions and occasions with different transfer torque requirements, enhance the universality of the coupling, realize overload protection and achieve better cushioning and damping effects. The present invention is convenient and reliable in installation, widens the application range of the magnetic coupling, realizes overall sealing, omits a shielding case in the magnetic coupling, reduces an operating air gap and increases the transfer torque.

To achieve the above purpose, the present invention adopts the following technical solution:

The magnetic coupling connects a driving shaft of a driving body and a driven shaft of a driven body and comprises a driving rotor sleeved on the driving shaft, a driven rotor sleeved on the driven shaft, external magnets mounted on the driving rotor and internal magnets mounted on the driven rotor and located on the inner sides of the external magnets; a plurality of internal magnets are arranged and uniformly distributed along the circumferential direction of the driven rotor; the external magnets and the internal magnets are aligned one by one along a radial direction; the internal magnets and the external magnets are magnetized along the radial direction; adjacent internal magnets have opposite magnetizing directions, and adjacent external magnets have opposite magnetizing directions; magnetic poles of the internal magnets are opposite to magnetic poles of the corresponding external magnets, and the driving rotor and the driven rotor form a working magnetic circuit through a magnetic field generated by the external magnets and a magnetic field generated by the internal magnets, wherein at least the external magnets are magnet exciting coils that generate a working magnetic field through power supply.

Preferably, the internal magnets are permanent magnets, and the external magnets are the magnet exciting coils that generate the working magnetic field through power supply; the driving rotor is of a tubular structure, and an inner end is sleeved on the driving shaft; the internal magnets are uniformly attached to the outer peripheral surface of the driven rotor along the circumferential direction and extend into an inner cavity of the driving rotor along the axial direction; the external magnets are mounted on the inner wall of the driving rotor and are aligned with the internal magnets one by one along the radial direction without contact; the driving rotor is provided with a conducting slip ring device that powers the external magnets; and the conducting slip ring device is electrically connected with the external magnets and an external power supply.

Preferably, the inner wall of the driving rotor is provided with winding flanges arranged along the axial direction and corresponding to the internal magnets one by one; the winding flanges protrude inwards along the radial direction from the inner wall of the driving rotor; and the magnet exciting coils are wound along the axial direction on the winding flanges to form the external magnets.

Preferably, the inner wall of the driving rotor is provided with annular planes arranged along the radial direction; the annular planes are separated from the winding flanges along the axial direction; the magnet exciting coils are wound on the winding flanges along the axial direction and the axial inner ends are in contact with the annular planes; and the axial outer ends are flush with the outer end of the driving rotor.

Preferably, the conducting slip ring device comprises a hollow shaft sleeved on the driving rotor, slip rings tightly sleeved on the hollow shaft, and an electric brush installed outside the hollow shaft and in elastic contact with the slip rings; a plurality of slip rings are arranged and uniformly distributed along the axial direction of the hollow shaft; the slip rings are electrically connected with the external magnets through conducting wires; one end of the electric brush is in elastic contact with the slip rings, and the other end can be connected with the external power supply; and the electric brush moves on the slip rings to conduct current with the rotation of the slip rings.

Preferably, an insulating sleeve is sleeved on the hollow shaft; the slip rings are tightly sleeved on the insulating sleeve; and adjacent slip rings are separated along the axial direction without contact.

Preferably, the insulating sleeve is provided with annular grooves corresponding to the slip rings; the slip rings are embedded into the annular grooves; and one end of the electric brush extends into the annular grooves and come into elastic contact with the slip rings.

Preferably, the conducting slip ring device also comprises a brush frame installed outside the hollow shaft; one end of the electric brush away from the slip rings is connected to the brush frame; the brush frame is provided with a spring corresponding to the electric brush; the electric brush is in elastic contact with the slip rings through the pressing force of the spring; the brush frame is provided with a wiring terminal that can be connected with the external power supply; and the wiring terminal is electrically connected with the electric brush.

Preferably, the conducting slip ring device also comprises a stator; the brush frame is installed outside the hollow shaft through the stator; the stator is coaxially arranged around the hollow shaft, and both ends are in seal fit connection with the driving body and the driven body respectively; and the brush frame is fixed to the stator.

In the use and adjustment method of the magnetic coupling, the current magnitude of the external magnets is adjusted according to the requirements for the transfer torque in the use conditions to adjust the transfer torque of the magnetic coupling and electromagnetic stiffness, so as to realize overload protection, cushioning and damping for the magnetic coupling.

The present invention has the following beneficial effects:

1. In the present invention, at least the external magnets are the magnet exciting coils that generate the working magnetic field through power supply. In the stationary state, the magnet exciting coils are charged with direct current to form an electromagnetic field; directions of magnetic lines of force are distributed radially; the internal magnets have magnetic poles opposite to the magnetic poles of the external magnets, and the internal magnets and the external magnets attract each other to form straight lines; and at this moment, the torque is zero. When the external magnets rotate under the drive of the driving shaft, the driven rotor is still at the stationary state at the beginning; at this moment, the corresponding external magnets start to deviate from the internal magnets by a certain angle; due to the existence of the angle, the N pole (S pole) of the external magnets has a pulling effect on the S pole (N pole) of the internal magnets, and the N pole (S pole) of the external magnets has a pushing effect on the previous N pole (S pole) of the internal magnets, so as to drive the driven rotor containing the internal magnets to rotate, thereby realizing the transfer of power and movement. At least the external magnets use the magnet exciting coils to provide the magnetic force, and the magnet exciting coils control the change of the magnetic field by changing the current, so that the transfer torque of the magnetic coupling is variable and the coupling is applicable to operating conditions and occasions with different transfer torque requirements by changing the size of the transfer torque, thereby enhancing the universality of the coupling.

2. When the machine is overloaded, the torque can be increased by changing the current magnitude to avoid failure or slipping phenomenon of the coupling and realize overload protection and more reliability. The magnetic coupling can ensure the transfer torque and match and design the optimal electromagnetic stiffness parameters by controlling the current magnitude of the magnet exciting coils according to the vibration and impact characteristics of the actual application conditions, thereby achieving better cushioning and damping effects.

3. Because the magnet exciting coils have no magnetism before electrified, the driving rotor can be easily installed in alignment with the driven rotor without electrification, and then electrified after being placed in a good position. The installation is convenient and reliable, and the shielding case between the internal magnets and the external magnets is omitted. Static seal of the magnetic coupling is realized by the stator of the conducting slip ring device, and the working air gap of the magnetic circuit between two rotors is minimized, thereby enhancing the working magnetic field, increasing the transfer torque and widening the application range of the magnetic coupling.

4. To power the magnet exciting coils of the outer rotor, the conducting slip ring device is adopted in the present invention. The device is installed separately, and is simple in structure and convenient in installation. Moreover, a stator part is respectively connected with the bodies at the driving side and the driven side to achieve the overall seal, omit the shielding case in the magnetic coupling, reduce the working air gap and increase the transfer torque.

DETAILED DESCRIPTION

Figure 1:
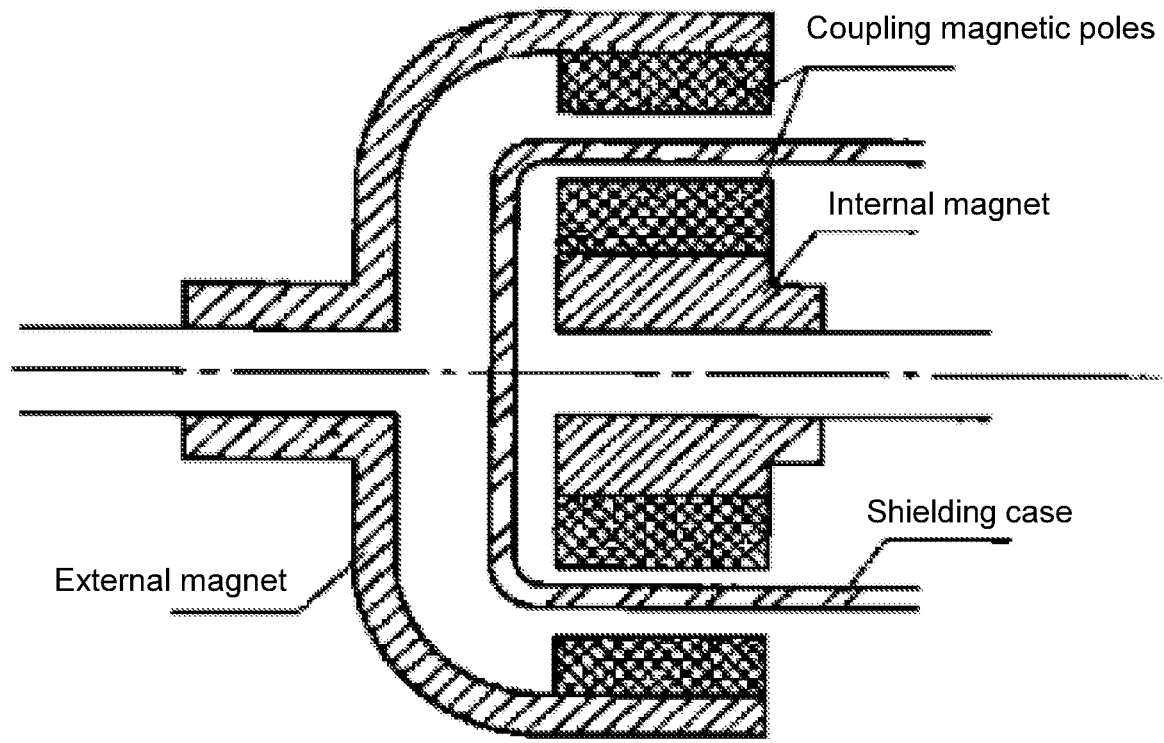
FIG. 1 is a structural schematic diagram of a magnetic coupling in the prior art.
Figure 2:
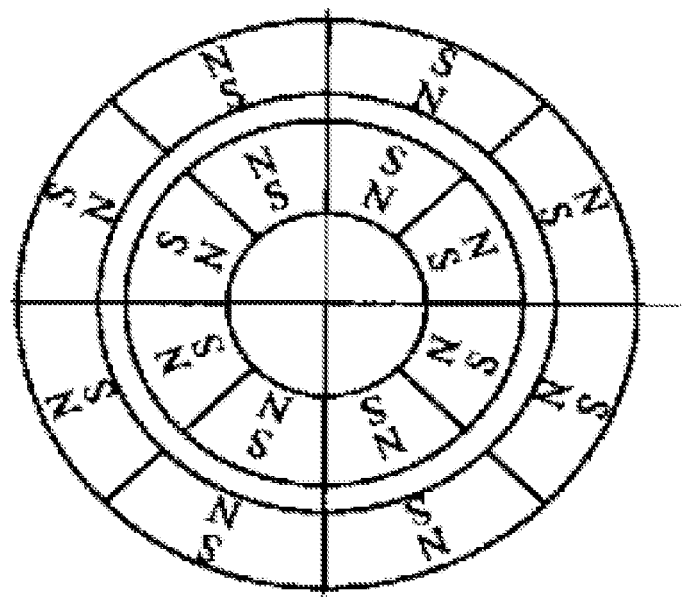
FIG. 2 is a distribution diagram of a magnetic circuit when a magnetic coupling in FIG. 1 is in a stationary state.
Figure 3:
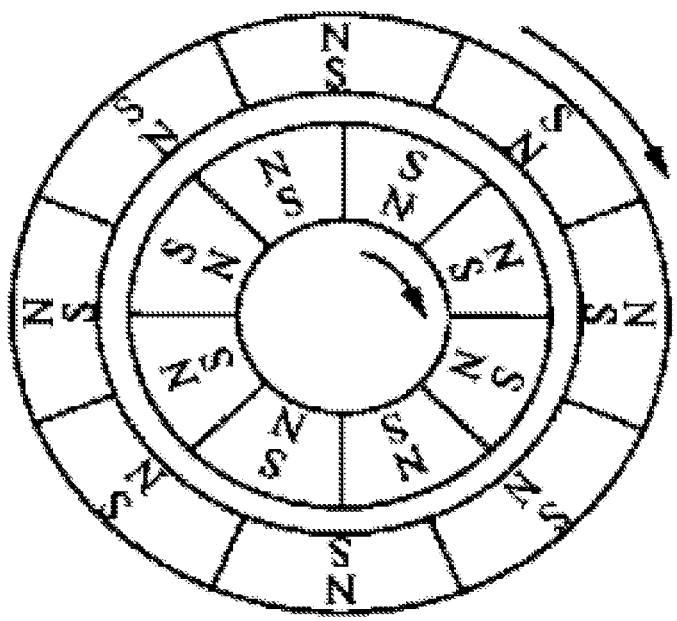
FIG. 3 is a distribution diagram of a magnetic circuit when a magnetic coupling in FIG. 1 rotates.
Figure 4:
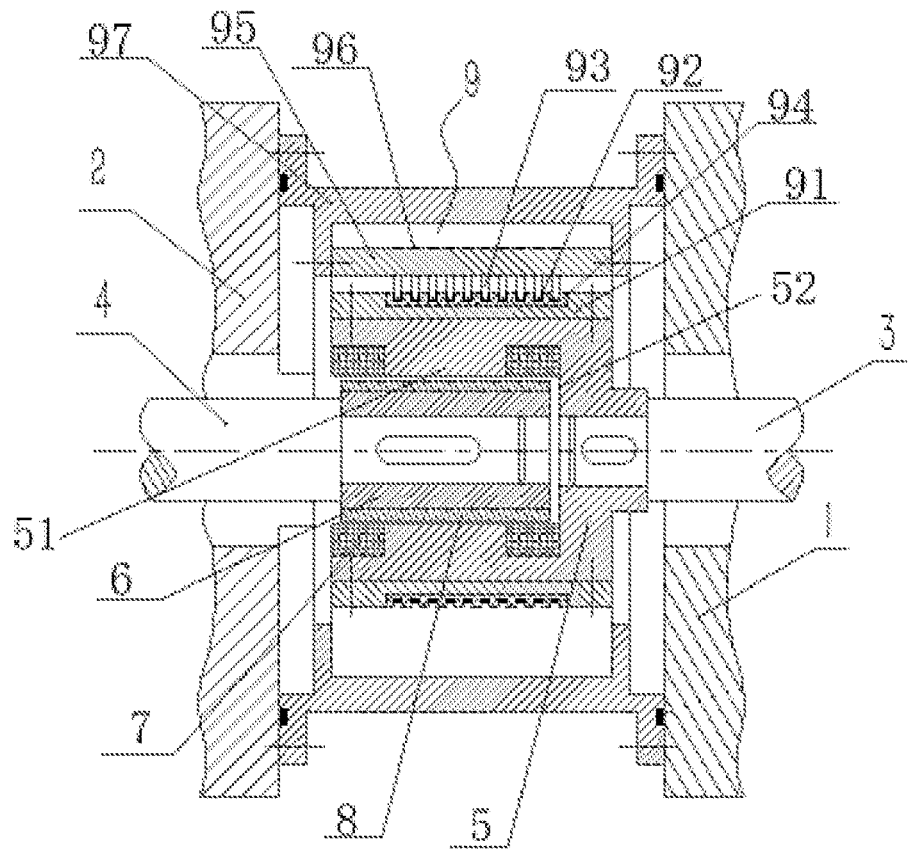
FIG. 4 is a structural schematic diagram of a magnetic coupling in the present invention.
Figure 5:
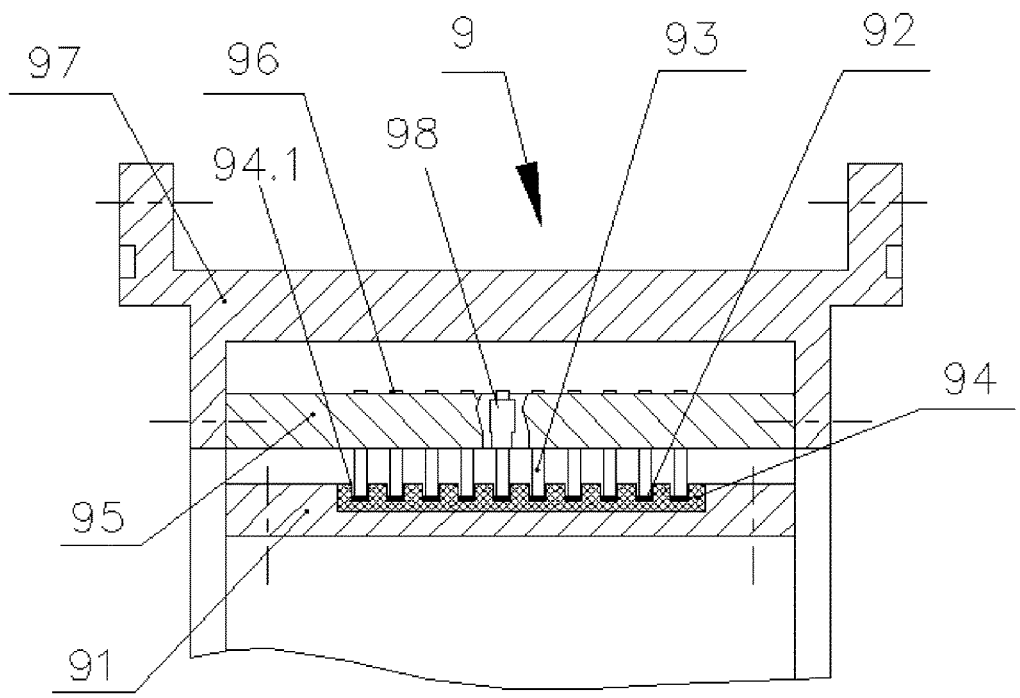
FIG. 5 is a structural schematic diagram of a conducting slip ring device.
Figure 6:
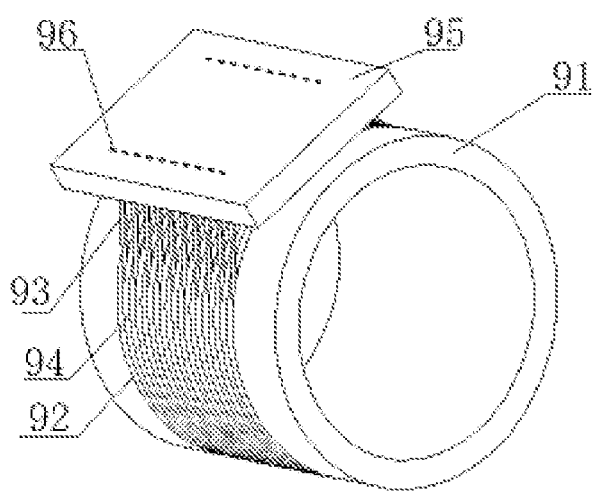
FIG. 6 is a stereogram of a conducting slip ring device without a stator.

Embodiments of the present invention are described in detail below in combination with FIG. 4 to FIG. 6.

A magnetic coupling connects a driving shaft 3 of a driving body 1 and a driven shaft 4 of a driven body 2 and comprises a driving rotor 5 sleeved on the driving shaft 3, a driven rotor 6 sleeved on the driven shaft 4, external magnets 7 mounted on the driving rotor 5 and internal magnets 8 mounted on the driven rotor 6 and located on the inner sides of the external magnets 7; a plurality of internal magnets 8 are arranged and uniformly distributed along the circumferential direction of the driven rotor 6; the external magnets 7 and the internal magnets 8 are aligned one by one along a radial direction; the internal magnets 8 and the external magnets 7 are magnetized along the radial direction; adjacent internal magnets 8 have opposite magnetizing directions, and adjacent external magnets 7 have opposite magnetizing directions; magnetic poles of the internal magnets 8 are opposite to magnetic poles of the corresponding external magnets 7, and the driving rotor 5 and the driven rotor 6 form a working magnetic circuit through a magnetic field generated by the external magnets 7 and a magnetic field generated by the internal magnets 8, wherein at least the external magnets 7 are magnet exciting coils that generate a working magnetic field through power supply.

In the above magnetic coupling, at least the external magnets 7 are the magnet exciting coils that generate the working magnetic field through power supply. In the stationary state, the magnet exciting coils are charged with direct current to form an electromagnetic field; directions of magnetic lines of force are distributed radially; the internal magnets 8 have magnetic poles opposite to the magnetic poles of the external magnets 7, and the internal magnets and the external magnets attract each other to form straight lines; and at this moment, the torque is zero. When the external magnets 7 rotate under the drive of the driving shaft 1, the driven rotor 2 is still at the stationary state at the beginning; at this moment, the corresponding external magnets 7 start to deviate from the internal magnets 8 by a certain angle; due to the existence of the angle, the N pole (S pole) of the external magnets has a pulling effect on the S pole (N pole) of the internal magnets, and the N pole (S pole) of the external magnets has a pushing effect on the previous N pole (S pole) of the internal magnets, so as to drive the driven rotor 6 containing the internal magnets 8 to rotate, thereby realizing the transfer of power and movement. At least the external magnets 7 use the magnet exciting coils to provide the magnetic force, and the magnet exciting coils control the change of the magnetic field by changing the current, so that the transfer torque of the magnetic coupling is variable and the coupling is applicable to operating conditions and occasions with different transfer torque requirements by changing the size of the transfer torque, thereby enhancing the universality of the coupling. When the machine is overloaded, the torque can be increased by changing the current magnitude to avoid failure or slipping phenomenon of the coupling and realize overload protection and more reliability. The magnetic coupling can ensure the transfer torque and match and design the optimal electromagnetic stiffness parameters by controlling the current magnitude of the magnet exciting coils according to the vibration and impact characteristics of the actual application conditions, thereby achieving better cushioning and damping effects. Because the magnet exciting coils have no magnetism before electrified, the outer rotor can be easily installed in alignment with the inner rotor without electrification, and then electrified after being placed in a good position. The installation is convenient and reliable, and the shielding case between the internal magnets and the external magnets is omitted. The working air gap of the magnetic circuit between two rotors is minimized, thereby enhancing the working magnetic field, increasing the transfer torque and widening the application range of the magnetic coupling.

The internal magnets 8 are permanent magnets, and the external magnets 7 are the magnet exciting coils that generate the working magnetic field through power supply; the driving rotor 5 is of a tubular structure, and an inner end is sleeved on the driving shaft 3; the internal magnets 8 are uniformly attached to the outer peripheral surface of the driven rotor 6 along the circumferential direction and extend into an inner cavity of the driving rotor 5 along the axial direction; the external magnets 7 are mounted on the inner wall of the driving rotor 5 and are aligned with the internal magnets 8 one by one along the radial direction without contact; the driving rotor 5 is provided with a conducting slip ring device 9 that powers the external magnets 7; and the conducting slip ring device 9 is electrically connected with the external magnets 7 and an external power supply to realize circuit connection of the external power supply, the conducting slip ring device and the magnet exciting coils.

The inner wall of the driving rotor 5 is provided with winding flanges 51 arranged along the axial direction and corresponding to the internal magnets 8 one by one; the winding flanges 51 protrude inwards along the radial direction from the inner wall of the driving rotor 5; and the magnet exciting coils are wound along the axial direction on the winding flanges 51 to form the external magnets 7. The winding flanges 51 are used for winding the magnet exciting coils. The winding flanges 51 are radial bulges and arranged along the axial direction for the convenience of winding the magnet exciting coils along the axial direction. The quantity of the winding flanges 51 is equal to the quantity of the internal magnets 8 and form one-to-one correspondence, so as to form the external magnets 7 that are in one-to-one correspondence with the internal magnets 8.

The inner wall of the driving rotor 5 is provided with annular planes 52 arranged along the radial direction; the annular planes 52 are separated from the winding flanges 51 along the axial direction; the magnet exciting coils are wound on the winding flanges 51 along the axial direction and the axial inner ends are in contact with the annular planes 52; and the axial outer ends are flush with the outer end of the driving rotor 5. The annular planes 52 are used for determining the axial thickness of the magnet exciting coils. When the magnet exciting coils are wound to come into contact with the annular planes 52, axial thickening is stopped. When the axial inner ends of the magnet exciting coils come into contact with the annular planes 52, the axial outer ends are just flush with the end parts of the driving rotor 5 to ensure that the winding of the magnet exciting coils does not exceed the limit. The winding formation of the external magnets 7 is more maneuverable. The sizes of the formed plurality of external magnets 7 are consistent to enhance the circumferential uniformity of the magnetic circuit of the internal magnets and the external magnets.

The conducting slip ring device 9 comprises a hollow shaft 91 sleeved on the driving rotor 5, slip rings 92 tightly sleeved on the hollow shaft 91, and an electric brush 93 installed outside the hollow shaft 91 and in elastic contact with the slip rings 92; a plurality of slip rings 92 are arranged and uniformly distributed along the axial direction of the hollow shaft 91; the slip rings 92 are electrically connected with the external magnets 7 through conducting wires; one end of the electric brush 93 is in elastic contact with the slip rings 92, and the other end can be connected with the external power supply; and the electric brush 93 moves on the slip rings 92 to conduct current with the rotation of the slip rings 92. When the driving shaft 3 rotates, the driving rotor 5 is driven to rotate, and the hollow shaft 91 rotates with the driving rotor 5. One end of the electric brush 22 contacts and moves on the slip rings 92 to form an electrically conductive path of the external power supply, the electric brush, the slip rings and the magnet exciting coils to power the magnet exciting coils. The conductive current of the external power supply is adjusted to adjust the current of the magnet exciting coils, to change the magnetic field strength generated by the magnet exciting coils and control the magnetic field change of the external magnets 7, thereby changing the transfer torque between the internal magnets and the external magnets to adapt to operating conditions and occasions with different transfer torque requirements.

An insulating sleeve 94 is sleeved on the hollow shaft 91; the slip rings 92 are tightly sleeved on the insulating sleeve 94; and adjacent slip rings 92 are separated along the axial direction without contact. The insulating sleeve 94 insulates the adjacent slip rings 92 and insulates the slip rings 92 and the hollow shaft 91 to improve the safety of conduction.

Specifically, the insulating sleeve 94 is provided with annular grooves 94.1 corresponding to the slip rings 92; the slip rings 92 are embedded into the annular grooves 94.1; and one end of the electric brush 93 extends into the annular grooves 94.1 and come into elastic contact with the slip rings 92. The annular grooves 94.1 are formed in the insulating sleeve 94, so that the adjacent slip rings 92 are completely insulated and the sleeving positions of the slip rings 92 are effectively located to ensure that the slip rings 92 may not deviate in the use process. Meanwhile, the electric brush 93 extends into the annular grooves 94.1 and come into contact with the slip rings 92; and the annular grooves 94.1 are used for limiting the contact end part of the electric brush 93 to ensure that the electric brush 93 and the slip rings 92 come into one-to-one contact. In the brushing process, the position of the electric brush 93 is located by the annular grooves 94.1 and may not deviate or separate from the corresponding slip rings 92. The structural reliability of the conducting slip ring device 9 is higher; effectiveness and reliability of conduction are higher; and the one-to-one assembling structures of the electric brush 93 and the slip rings 92 are easier to be realized.

The conducting slip ring device 9 also comprises a brush frame 95 installed outside the hollow shaft 91; one end of the electric brush 93 away from the slip rings 92 is connected to the brush frame 95; the brush frame 95 is provided with a spring 98 corresponding to the electric brush 93; the electric brush 93 is in elastic contact with the slip rings 92 through the pressing force of the spring 98; the brush frame 95 is provided with a wiring terminal 96 that can be connected with the external power supply; and the wiring terminal 96 is electrically connected with the electric brush 93. The spring 98 on the brush frame 95 presses the electric brush 93 so that the electric brush 93 is always in elastic contact with the slip rings 92. Moreover, the wiring terminal 96 is installed on the brush frame 95, which is easy to realize the connection between the external power supply and the electric brush 93, so that the conducting slip ring device 9 is simple in structure and easy to realize installation and wiring.

The conducting slip ring device 9 also comprises a stator 97; the brush frame 95 is installed outside the hollow shaft 91 through the stator 97; the stator 97 is coaxially arranged around the hollow shaft 91, and both ends are in seal fit connection with the driving body 1 and the driven body 2 respectively; and the brush frame 95 is fixed to the stator 97. Through the arrangement of the stator 97, static seal of the magnetic coupling is realized; the shielding case between the internal magnets and the external magnets is omitted; and the working air gap of the magnetic circuit between the inner rotor and the outer rotor is minimized, thereby enhancing the working magnetic field, increasing the transfer torque and widening the application range of the magnetic coupling. Moreover, the brush frame 95 is fixed on the stator 97, which can ensure that the brush frame 95 may not rotate due to the rotation of the hollow shaft 91. The structural reliability of the conducting slip ring device 9 is higher. The conducting slip ring device 9 can be installed only through the separate installation of the hollow shaft 91 and the driving rotor 5. The structure is simple and the installation is convenient. The stator 97 is respectively connected with the body at the driving side and the body at the driven side to achieve the overall seal, omit the shielding case in the magnetic coupling, reduce the working air gap and increase the transfer torque.

In the use and adjustment method of the magnetic coupling, the current magnitude of the external magnets 7 is adjusted according to the requirements for the transfer torque in the use conditions to adjust the transfer torque of the magnetic coupling and electromagnetic stiffness, so as to realize overload protection, cushioning and damping for the magnetic coupling.

In the above adjustment method, the magnet exciting coils of the external magnets 7 control the change of the magnetic field by changing the current, so that the transfer torque of the magnetic coupling is variable and the coupling is applicable to operating conditions and occasions with different transfer torque requirements by changing the size of the transfer torque, thereby enhancing the universality of the coupling. When the machine is overloaded, the torque is increased by changing the current magnitude to avoid failure or slipping phenomenon of the coupling and realize overload protection and more reliability. The magnetic coupling can ensure the transfer torque and match and design the optimal electromagnetic stiffness parameters by controlling the current magnitude of the magnet exciting coils according to the vibration and impact characteristics of the actual application conditions, thereby achieving better cushioning and damping effects.

The technical solutions of the embodiments of the present invention are fully described above in combination with the drawings. It should be noted that the described embodiments are merely part of the embodiments of the present invention. Based on the embodiments in the present invention, all other embodiments obtained by those ordinary skilled in the art without contributing creative labor will belong to the protection scope of the present invention.

What is claimed is:

1. A magnetic coupling, wherein the magnetic coupling connects a driving shaft of a driving body and a driven shaft of a driven body, the magnetic coupling comprises a driving rotor sleeved on the driving shaft, a driven rotor sleeved on the driven shaft, external magnets mounted on the driving rotor and internal magnets mounted on the driven rotor and located on the inner sides of the external magnets; a plurality of internal magnets are arranged and uniformly distributed along a circumferential direction of the driven rotor; the external magnets and the internal magnets are aligned one by one along a radial direction; the internal magnets and the external magnets are magnetized along the radial direction; adjacent internal magnets have opposite magnetizing directions, and adjacent external magnets have opposite magnetizing directions; magnetic poles of the internal magnets are opposite to magnetic poles of the corresponding external magnets, and the driving rotor and the driven rotor form a working magnetic circuit through a magnetic field generated by the external magnets and a magnetic field generated by the internal magnets, wherein at least the external magnets are magnet exciting coils that generate a working magnetic field through power supply.

2. The magnetic coupling according to claim 1, wherein the internal magnets are permanent magnets, and the external magnets are the magnet exciting coils that generate the working magnetic field through power supply; the driving rotor is of a tubular structure, and an inner end is sleeved on the driving shaft; the internal magnets are uniformly attached to an outer peripheral surface of the driven rotor along a circumferential direction and extend into an inner cavity of the driving rotor along an axial direction; the external magnets are mounted on an inner wall of the driving rotor and are aligned with the internal magnets one by one along the radial direction without contact; the driving rotor is provided with a conducting slip ring device that powers the external magnets; and the conducting slip ring device is electrically connected with the external magnets and an external power supply.

3. The magnetic coupling according to claim 2, wherein the inner wall of the driving rotor is provided with winding flanges arranged along the axial direction and corresponding to the internal magnets one by one; the winding flanges protrude inwards along the radial direction from the inner wall of the driving rotor; and the magnet exciting coils are wound along the axial direction on the winding flanges to form the external magnets.

4. The magnetic coupling according to claim 3, wherein the inner wall of the driving rotor is provided with annular planes arranged along the radial direction; the annular planes are separated from the winding flanges along the axial direction; the magnet exciting coils are wound on the winding flanges along the axial direction and the axial inner ends are in contact with the annular planes; and an axial outer ends are flush with an outer end of the driving rotor.

5. The magnetic coupling according to claim 2, wherein the conducting slip ring device comprises a hollow shaft sleeved on the driving rotor, slip rings tightly sleeved on the hollow shaft, and an electric brush installed outside the hollow shaft and in elastic contact with the slip rings; a plurality of slip rings are arranged and uniformly distributed along an axial direction of the hollow shaft; the slip rings are electrically connected with the external magnets through conducting wires; one end of the electric brush is in elastic contact with the slip rings, and the other end is capable of connecting with the external power supply; and the electric brush moves on the slip rings to conduct current with a rotation of the slip rings.

6. The magnetic coupling according to claim 5, wherein an insulating sleeve is sleeved on the hollow shaft; the slip rings are tightly sleeved on the insulating sleeve; and adjacent slip rings are separated along the axial direction without contact.

7. The magnetic coupling according to claim 6, wherein the insulating sleeve is provided with annular grooves corresponding to the slip rings; the slip rings are embedded into the annular grooves; and one end of the electric brush extends into the annular grooves and come into elastic contact with the slip rings.

8. The magnetic coupling according to claim 5, wherein the conducting slip ring device also comprises a brush frame installed outside the hollow shaft; one end of the electric brush away from the slip rings is connected to the brush frame; the brush frame is provided with a spring corresponding to the electric brush; the electric brush is in elastic contact with the slip rings through a pressing force of the spring; the brush frame is provided with a wiring terminal capable of connecting with the external power supply; and the wiring terminal is electrically connected with the electric brush.

9. The magnetic coupling according to claim 8, wherein the conducting slip ring device also comprises a stator; the brush frame is installed outside the hollow shaft through the stator; the stator is coaxially arranged around the hollow shaft, and both ends are in seal fit connection with the driving body and the driven body respectively; and the brush frame is fixed to the stator.

10. An use and adjustment method of the magnetic coupling according to claim 1, wherein a current magnitude of the external magnets is adjusted according to a requirements for a transfer torque in the use conditions to adjust a transfer torque of the magnetic coupling and electromagnetic stiffness, so as to realize overload protection, cushioning and damping for the magnetic coupling.

\* \* \* \* \*